(12) United States Patent
Bhattacharjee et al.

(10) Patent No.: US 10,366,414 B1
(45) Date of Patent: Jul. 30, 2019

(54) PRESENTATION OF CONTENT ITEMS IN VIEW OF COMMERCIALITY

(71) Applicant: Google LLC, Mountain View, CA (US)

(72) Inventors: Rajat Bhattacharjee, Mountain View, CA (US); Aranyak Mehta, Mountain View, CA (US); Benyu Zhang, Fremont, CA (US); Vivek Raghunathan, Fremont, CA (US)

(73) Assignee: Google LLC, Mountain View, CA (US)

( * ) Notice: Subject to any disclaimer, the term of this patent is extended or adjusted under 35 U.S.C. 154(b) by 15 days.

(21) Appl. No.: 15/178,833

(22) Filed: Jun. 10, 2016

Related U.S. Application Data

(63) Continuation of application No. 12/981,211, filed on Dec. 29, 2010, now Pat. No. 9,390,139.

(60) Provisional application No. 61/357,971, filed on Jun. 23, 2010.

(51) Int. Cl.
*G06F 16/2455* (2019.01)
*G06Q 30/02* (2012.01)
*G06F 16/951* (2019.01)
*G06F 16/955* (2019.01)

(52) U.S. Cl.
CPC ..... *G06Q 30/0256* (2013.01); *G06F 16/2455* (2019.01); *G06F 16/951* (2019.01); *G06F 16/9558* (2019.01); *G06Q 30/0277* (2013.01)

(58) Field of Classification Search
CPC ............ G06Q 30/0256; G06Q 30/0277; G06F 17/30477; G06F 17/30864; G06F 17/30882; G06F 16/9558; G06F 16/2455; G06F 16/951
See application file for complete search history.

(56) References Cited

U.S. PATENT DOCUMENTS

| | | |
|---|---|---|
| 5,848,396 A | 12/1998 | Gerace |
| 7,043,471 B2 | 5/2006 | Cheung et al. |
| 7,054,857 B2 | 5/2006 | Cunningham et al. |
| 7,065,500 B2 | 6/2006 | Singh et al. |
| 7,136,875 B2 | 11/2006 | Anderson et al. |
| 7,225,184 B2 | 5/2007 | Carrasco et al. |
| 7,231,395 B2 | 6/2007 | Fain et al. |
| 7,284,008 B2 | 10/2007 | Henkin et al. |
| 7,295,996 B2 | 11/2007 | Skinner |

(Continued)

OTHER PUBLICATIONS

Radlinski et al., "Optimizing relevance and revenue in ad search: a query substitution approach," Proceedings of the 31st annual international ACM SIGIR conference on Research and development in information retrieval, ACM, 2008. (Year: 2008).*

(Continued)

*Primary Examiner* — Jay A Morrison
(74) *Attorney, Agent, or Firm* — Fish & Richardson P.C.

(57) ABSTRACT

Methods, systems, and apparatus, including computer programs encoded on a computer storage medium, for enhancing selecting relevant and diverse advertisements. In one aspect, a method includes receiving an initial query, selecting one or more additional queries relating to the initial query, including selecting additional queries having a greatest commerciality, identifying one or more content items for each of the additional queries, the one or more content items forming a content block, and providing a content block and an associated additional query to a client device to be displayed along with search results associated with the initial query.

20 Claims, 13 Drawing Sheets

(56) References Cited

U.S. PATENT DOCUMENTS

| | | |
|---|---|---|
| 7,373,599 B2 | 5/2008 | McElfresh et al. |
| 7,617,205 B2 | 11/2009 | Bailey et al. |
| 7,716,229 B1 | 5/2010 | Srivastava et al. |
| 2005/0027699 A1 | 2/2005 | Awadallah et al. |
| 2005/0131758 A1 | 6/2005 | Desikan et al. |
| 2006/0020591 A1 | 1/2006 | Kommers et al. |
| 2006/0224554 A1 | 10/2006 | Bailey et al. |
| 2008/0183695 A1 | 7/2008 | Jadhav |
| 2008/0256034 A1 | 10/2008 | Chang et al. |
| 2008/0256061 A1* | 10/2008 | Chang .................. G06Q 30/02 |
| 2009/0006207 A1 | 1/2009 | Datar et al. |
| 2009/0299998 A1 | 12/2009 | Kim |
| 2010/0049678 A1 | 2/2010 | Huang et al. |
| 2011/0071898 A1 | 3/2011 | Feng et al. |

OTHER PUBLICATIONS

Gupta et al, "Catching the Drift: Learning Broad Matches from Clickthrough Data", KDD '09, Jun. 28-Jul. 1, 2009, Paris, France. (Year: 2009).*

* cited by examiner

From FIG. 3A

CHILDTOYZ JR.
WHAT IS CHILDTOYZ JR.? CHILDTOYZ JR. PETS ARE LOVABLE PLUSH ANIMALS THAT EACH COME WITH A
UNIQUE PET CODE. WELCOME TO CHILDTOYZ JR. HOME - NEW MEMBER...
WWW.CHILDTOYZJR.COM/ - CACHED - SIMILAR 🔍 ⊕ ⊠

CHILDTOYZ INSIDER -- CHILDTOYZ NEWS, INFO, RECIPES & FORUMS!
SEP 11, 2009 ... FREE CHILDTOYZ, SECRET RECIPES, CHAT FORUM, NEWS, TIPS AND TRICKS AND GAME
STRATEGIES FOR CHILDTOYZ WORLD.
WWW.CHILDTOYZINSIDER.COM/ - 34 MINUTES AGO - CACHED - SIMILAR 🔍 ⊕ ⊠

AMAZON.COM: CHILDTOYZ: TOYS & GAMES
BESTSELLERS IN CHILDTOYZ. CHILDTOYZ BROWN SPRINGER SPANIEL. OUR PRICE: $6.70. CHILDTOYZ HM222
SILVERSOFT CAT PLUSH ANIMAL. OUR PRICE: $6.20. CHILDTOYZ RACCOON...
WWW.AMAZON.COM/CHILDTOYZ/81E=UTF8&NODE... - CACHED - SIMILAR 🔍 ⊕ ⊠

THE #1 WEBSITE FOR EVERYTHING ABOUT CHILDTOYZ
CHILDTOYZ HUB IS THE FUNNIEST PLACE TO BE FOR NEWEST INFORMATION ON THE WORLD OF CHILDTOYZ AND
LIL TOYZ.
WWW.CHILDTOYZHUB.COM/ - CACHED - SIMILAR 🔍 ⊕ ⊠

NEWS RESULTS FOR CHILDTOYZ

📰 RESTAURANT TO OFFER EXCLUSIVE CHILDTOYZ PET - 1 DAY AGO
OPOSSUM IS THE NEW ULTRA-SOFT PLUSH TOY FROM CHILDTOYZ AND WILL BE AVAILABLE ONLY AT
RESTAURANT STARTING ON SEPTEMBER 11TH. "IT IS A TREMENDOUS HONOR TO ...
PR-USA.NET (PRESS RELEASE) - 25 RELATED ARTICLES»

SEARCHES RELATED TO: CHILDTOYZ
CHILDTOYZ CHEATS    FUTURE CHILDTOYZ    CHILDTOYZ CODES    CHILDTOY.COM TOY CO. WEBSITE
CHILDTOYZ RECIPES   CHILDTOYZ LOGIN     CHILDTOYZ CLUB     CHILDTOYZ 2008

GOOOOOOOOOOGLE  △ NEXT
1 2 3 4 5 6 7 8 9 10

---

WE SELL CHILDTOYZ PETS HERE  306E
FULL TIME TOY CO. CHILDTOYZ WORLD STORE
- ALL NEW PLUSH, CHARMS, CARDS & MORE
WWW.BBTOYSTORE.COM

CHILDTOYZ PETS  306F
FIND CHILDTOYZ PETS
AT WEBCRAWLER.COM
WWW.WEBCRAWLER.COM

— 305B

— 301

CHILDTOYZ CHARMS  ← 303C
BID ON CHILDTOYZ CHARMS NOW!
FIND STUFFED ANIMALS.  306G
WWW.EBAY.COM

CHILDTOYZ CHARMS  306H
10,000+ CHILDTOYZ CHARMS
SHOP, COMPARE AND SAVE AT PRONTO.
CHARM.PRONTO.COM

— 305C

300

[CHILDTOYZ]  [SEARCH]

⊕ ADD A RESULT · SEE ALL MY SEARCHWIKI NOTES · SEE ALL NOTES FOR THIS SEARCHWIKI · LEARN MORE
SEARCH WITHIN RESULTS · LANGUAGE TOOLS · SEARCH HELP · DISSATISFIED? HELP US IMPROVE · TRY GOOGLE EXPERIMENTAL
GOOGLE HOME · ADVERTISING PROGRAMS · BUSINESS SOLUTIONS · PRIVACY · ABOUT GOOGLE

FIG. 3B

From FIG. 3C

CHILDTOYZ JR.
WHAT IS CHILDTOYZ JR.? CHILDTOYZ JR. PETS ARE LOVABLE PLUSH ANIMALS THAT EACH COME WITH A
UNIQUE PET CODE. WELCOME TO CHILDTOYZ JR. HOME - NEW MEMBER...
WWW.CHILDTOYZJR.COM/ - CACHED - SIMILAR - ⊕ ⊠

CHILDTOYZ INSIDER – CHILDTOYZ NEWS, INFO, RECIPES & FORUMS!
SEP 11, 2009 ... FREE CHILDTOYZ, SECRET RECIPES, CHAT FORUM, NEWS, TIPS AND TRICKS AND GAME
STRATEGIES FOR CHILDTOYZ WORLD.
WWW.CHILDTOYZINSIDER.COM/ - 54 MINUTES AGO - CACHED - SIMILAR - ⊕ ⊠

AMAZON.COM: CHILDTOYZ: TOYS & GAMES
BESTSELLERS IN CHILDTOYZ. CHILDTOYZ BROWN SPRINGER SPANIEL. OUR PRICE: $6.70. CHILDTOYZ HM222
SILVERSOFT CAT PLUSH ANIMAL. OUR PRICE $6.20. CHILDTOYZ RACCOON ...
WWW.AMAZON.COM/CHILDTOYZ/B?IE=UTF8&NODE... - CACHED - SIMILAR - ⊕ ⊠

THE #1 WEBSITE FOR EVERYTHING ABOUT CHILDTOYZ
CHILDTOYZ HUB IS THE FUNNEST PLACE TO BE FOR NEWEST INFORMATION ON THE WORLD OF CHILDTOYZ AND
LIL TOYZ
WWW.CHILDTOYZHUB.COM/ - CACHED - SIMILAR - ⊕ ⊠

NEWS RESULTS FOR CHILDTOYZ
◁ RESTAURANT TO OFFER EXCLUSIVE CHILDTOYZ PET - 1 DAY AGO
OPOSSUM IS THE NEW ULTRA-SOFT PLUSH TOY FROM CHILDTOYZ AND WILL BE AVAILABLE ONLY AT
RESTAURANT STARTING ON SEPTEMBER 11TH. "IT IS A TREMENDOUS HONOR TO ...
PR-USA.NET [PRESS RELEASE] - 25 RELATED ARTICLES»

SEARCHES RELATED TO: CHILDTOYZ
CHILDTOYZ CHEATS    FUTURE CHILDTOYZ    CHILDTOYZ CODES    CHILDTOY.COM TOY CO. WEBSITE
CHILDTOYZ RECIPES   CHILDTOYZ LOGIN     CHILDTOYZ CLUB     CHILDTOYZ 2008

G O O O O O O O O G L E
1 2 3 4 5 6 7 8 9 10
△ NEXT

WE SELL CHILDTOYZ PETS HERE    316E
FULL TIME TOY CO. CHILDTOYZ WORLD STORE
-ALL NEW PLUSH, CHARMS, CARDS & MORE
WWW.BBTOYSTORE.COM

CHILDTOYZ PETS    316F
FIND CHILDTOYZ PETS
AT WEBCRAWLER.COM
WWW.WEBCRAWLER.COM
⊕ SEE MORE ADS FOR CHILDTOYZ TRADING PETS 315B
311
313C

RELATED TO CHILDTOYZ CHARMS:

CHILDTOYZ CHARMS
BID ON CHILDTOYZ CHARMS NOW!
FIND STUFFED ANIMALS.    316G
WWW.EBAY.COM

CHILDTOYZ CHARMS    316H
10,000+ CHILDTOYZ CHARMS
SHOP, COMPARE AND SAVE AT PRONTO.
CHARM.PRONTO.COM
⊕ SEE MORE ADS FOR CHILDTOYZ CHARMS 317B
315C
317C
310

[CHILDTOYZ]    [SEARCH]
⊕ ADD A RESULT - SEE ALL MY SEARCHWIKI NOTES - SEE ALL NOTES FOR THIS SEARCHWIKI - LEARN MORE

SEARCH WITHIN RESULTS - LANGUAGE TOOLS - SEARCH HELP - DISSATISFIED? HELP US IMPROVE - TRY GOOGLE EXPERIMENTAL
GOOGLE HOME - ADVERTISING PROGRAMS - BUSINESS SOLUTIONS - PRIVACY - ABOUT GOOGLE

PRESENTATION OF CONTENT ITEMS IN VIEW OF COMMERCIALITY

CROSS-REFERENCE TO RELATED APPLICATION

This application is a continuation application of, and claims priority to, U.S. patent application Ser. No. 12/981,211, titled "Presentation of Content Items In view Of Commerciality," filed on Dec. 29, 2010, which application claims priority to U.S. Provisional Application No. 61/357,971, filed on Jun. 23, 2010. The disclosure of each of the foregoing applications is incorporated herein by reference.

BACKGROUND

This specification generally relates to content presentation.

A search engine results page provides a user of a search engine with a list of search results that the search engine identifies in response to a search query. Search engine results pages may include advertisements that are relevant to the search query. Advertisements, which are also referred to as "sponsored listings," are typically displayed on the right hand side of a search engine results page or directly above the search results, although other locations are possible.

The user, the search engine provider, and the advertiser may all benefit when the user selects or otherwise interacts with an advertisement that is displayed on the search engine results page. When the search engine results page includes advertisements that are not interesting to the user, the user may become annoyed and quickly navigate away without selecting or interacting with an advertisement. As a result, the opportunity for the user, the search engine provider, and the advertiser to benefit may be reduced.

SUMMARY

In general, one innovative aspect of the subject matter described in this specification may be embodied in methods for selecting and providing advertisements that are relevant to a user of a search engine. To accomplish this, an ad selector engine may select candidate advertisements that are targeted to an initial query (where the query can include one or more query terms) that the user has submitted, as well as candidate advertisements that are targeted to one or more additional queries (sometimes referred to here as "revised queries," "revised query terms," "suggested queries," or "suggested query terms") that are automatically derived from the initial query. An auction engine may dynamically perform a competition among advertisers associated with candidate advertisements, to select a subset of the candidate advertisements. The search engine returns search results that are used to assemble a search engine results page that, among other things, an advertisement box that references the initial query and advertisements from the subset that have been selected for the initial query, and one or more advertisement boxes that reference the additional queries and advertisements from the subset that have been selected for the additional queries.

As used by this specification, a "search query" (also including, for example, a "voice query" when spoken instead of initially input as text) includes one or more query terms that a user submits to a search engine when the user requests the search engine to execute a search for information, where a "term" or a "query term" includes one or more whole or partial words, characters, or strings of characters.

Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

One or more additional queries can be identified and then content associated therewith can be provided in a block along with a respective additional query. Additional queries can be selected, for example, based on contextual relevance. Other considerations are possible, for example, considerations relating to utility, diversity and commerciality among others.

In general, another innovative aspect of the subject matter described in this specification may be embodied in methods that include the actions of receiving an initial query, selecting one or more additional queries relating to the initial query, including selecting additional queries having a greatest commerciality, identifying one or more content items for each of the additional queries, the one or more content items forming a content block, and providing a content block and an associated additional query to a client device to be displayed along with search results associated with the initial query.

In general, another innovative aspect of the subject matter described in this specification may be embodied in methods that include the actions of receiving an initial query, selecting one or more additional queries relating to the initial query, including selecting additional queries having a greatest commerciality, and providing the additional queries to a client device to be displayed along with search results associated with the initial query.

These and other embodiments may each optionally include one or more of the following features. In various examples, the initial query includes one or more query terms; the additional query includes one or more terms from the initial query; the additional query includes one or more terms from the initial query and one or more additional terms; each additional query includes at least a portion of the initial query; generating a graph representing possible paths from the initial query to other queries, the graph including nodes where each node represents a potential next query and where edges of the graph include weights that reflect a probability that a successor node follows a predecessor node in a search session; the commerciality is a measure of content associated with an additional query; the commerciality is a measure of the terms associated with the additional query; the commerciality is measured by historical performance of one or more content items that are displayed with results when the additional query is received; determining performance data associated with content items presented along with a given additional query; the greatest commerciality is based on one or more signals; and the one or more signals can be selected from the group comprising revenue generated from a respective additional query, a number of content items shown in response to each respective additional query, a long click or short click associated with a content item shown in response to each respective additional query, or commerce keywords associated with search results shown in response to each respective additional query.

Particular embodiments of the subject matter described in this specification may be implemented to realize none, one or more of the following advantages. Advertisements presented to users on search engine results pages are likely to be more interesting to the user, improving the overall search experience. The advertiser may increase their sales opportunities, and the search engine provider may receive additional revenue, as more users select the advertiser's advertisements. The search engine may generate fewer search engine results pages that include no advertisements. By displaying advertisements relating to multiple query terms, ad relevance and ad response rates may be improved. Users that might not otherwise manually refine query terms may be encouraged to interact with the search engine through a visual query refinement mechanism.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 3A to 3G show example search engine results pages.

Like reference symbols in the various drawings indicate like elements.

DETAILED DESCRIPTION

Briefly, a system selects and provides one or more content items (e.g., advertisements or "ads") that are relevant to a user of the system. Reference will be made in the following materials to providing ads, however other forms of content items can be provided. In some implementations, to accomplish this, an ad selector engine may select candidate advertisements that are targeted to an initial query that the user has submitted, as well as candidate advertisements that are targeted to one or more additional queries that are automatically derived from the initial query. An auction engine may dynamically perform a competition, i.e., an auction, among advertisers associated with candidate advertisements, to select one or more subsets of the candidate advertisements to include in an ad block.

Figure 1:
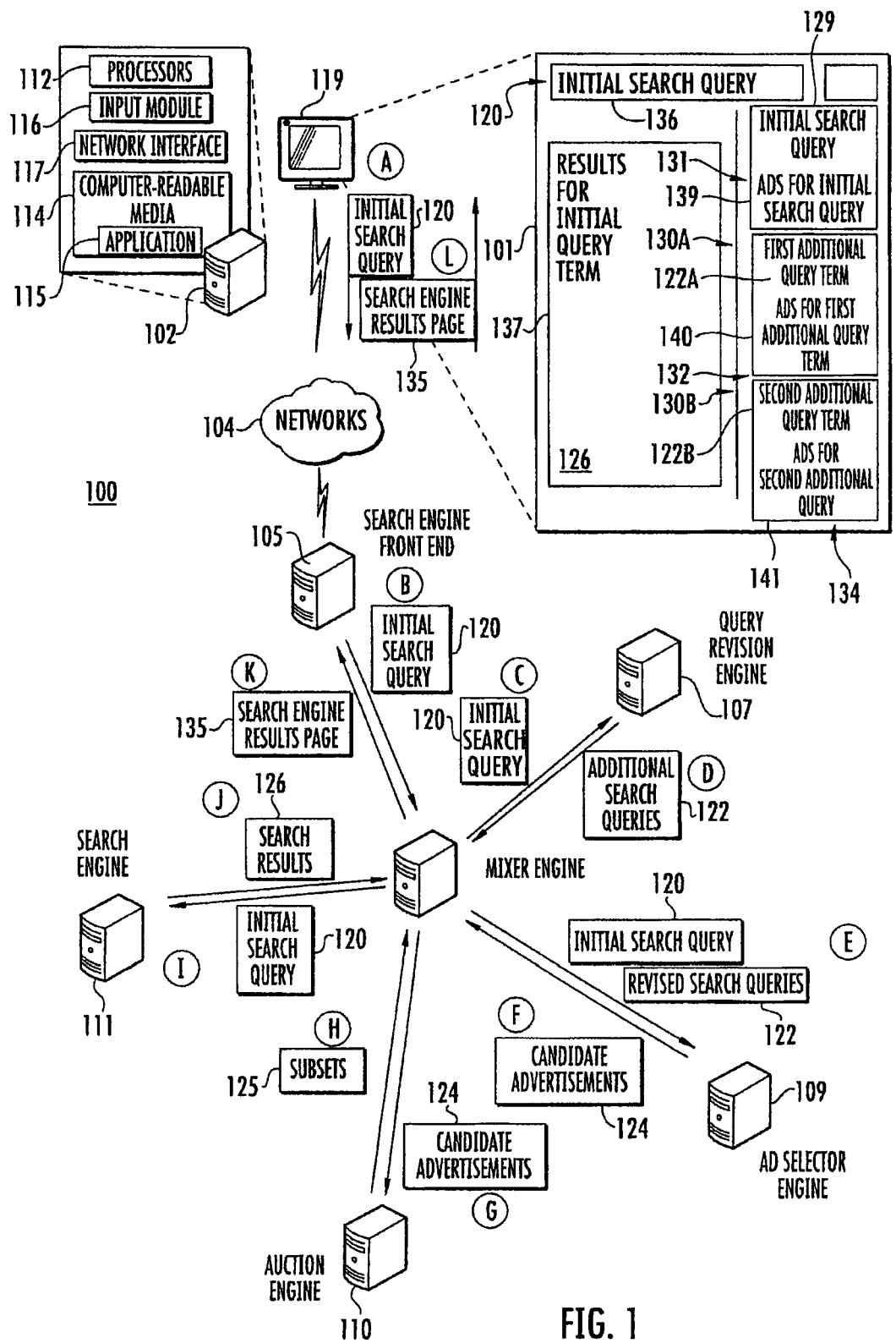
FIG. 1 is a diagram of an example system that can select content on a search engine results page.

FIG. 1 is a diagram of an example system 100 that can provide content items on a search engine results page 101. FIG. 1 also illustrates a flow of data within the system 100 during states (a) to (m), where the states (a) to (m) may occur in the illustrated sequence, or they may occur in a sequence that is different than is illustrated.

The search engine 111 returns search results that are used by a mixer engine 106 to assemble the search engine results page 101. Among other things, the search engine results page 101 references an initial query 120 (e.g., using reference 129) and additional queries 122 (e.g., using reference 130), and that includes advertisements 131 from a subset 125 that have been selected for the initial query and advertisements 132, 134 from the subset 125 that have been selected for the additional queries 122.

In more detail, the system 100 includes a client device 102 that communicates over one or more networks 104 with a search engine front end (or a "gateway server") 105, the mixer engine 106, the query reviser engine 107, the ad selector engine 109, the auction engine 110, the search engine 111, and, optionally, other engines. As used by this specification, an "engine" (or "software engine") refers to a software-implemented input/output system that provides an output that is different than the input. An engine may be an encoded block of functionality, such as a library, a platform, Software Development Kit ("SDK") or an object. The networks 104 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The client device 102, the search engine front end 105, the mixer engine 106, the query reviser engine 107, the ad selector engine 109, the auction engine 110, and the search engine 111 may each be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device includes one or more processors 112, computer readable media 114 that store software applications 115 (e.g. a browser or layout engine), an input module 116 (e.g., a keyboard or mouse), communication interface 117, and a display 119. The computing device or devices that implement the search engine front end 105, the mixer engine 106, the query reviser engine 107, the ad selector engine 109, the auction engine 110, and the search engine 111 may include similar or different components.

Two or more of the search engine front end 105, the mixer engine 106, the query reviser engine 107, the ad selector engine 109, the auction engine 110, and the search engine 111 may be implemented on the same computing device, or on different computing devices. Because the search engine results page 101 is generated based on the collective activity of the search engine front end 105, the mixer engine 106, the query reviser engine 107, the ad selector engine 109, the auction engine 110, and the search engine 111, the user of the client device 101 may refer to these engines collectively as a "search engine." This specification, however, refers to the search engine 111, and not the collection of engines, as the "search engine," since the search engine 111 identifies the search results in response to the user-submitted search query.

In general, the search engine front end 105 receives queries from client devices, and routes the queries to the appropriate engines so that search engine results pages may be generated. In some implementations, routing occurs by referencing static routing tables, or routing may occur based on the current network load of an engine, so as to accomplish a load balancing function. The search engine front end 105 also provides the resulting search engine results pages to the respective client devices. In doing so, the search engine front end 105 acts as a gateway, or interface between client devices and the search engine 111.

The mixer engine 106 temporarily stores and collates data that is generated by the various engines, and generates search engine results pages using this data. The mixer engine 106 determines the sequence in which to request data from various engines, and submits formatted requests and receives responses from the various engines according to the desired sequence. The sequence may be determined from a sequence table or chart, or from rules that specify how particular types of queries are to be processed, and that identify the various engines that are to generate portions of the data that make up a search engine results page.

The query reviser engine 107 applies query terms, i.e., the initial query, to various query revision models, to generate additional queries that, in some implementations, match a same or a similar context as an input query. Several example query revision strategies which may be used by the query reviser engine 107 are described in U.S. Pat. No. 7,617,205, issued Nov. 10, 2009, which is incorporated by reference in the entirety (including its FIGS. 1A and 1B, which are incorporated by reference in particular), and U.S. Pat. App. Pub. No. 2006/0224554, published Oct. 5, 2006 which is incorporated by reference in the entirety (including its FIGS. 1A and 1B, which are incorporated by reference in particular).

In some implementations, the additional queries are relevant to the initial query, yet at the same time the additional queries may be required to be diverse with each other. Additional query selection is described below. In other implementations, additional queries are generated by the query reviser engine 107 before the initial query 120 is received.

The ad selector engine 109 selects candidate advertisements that are relevant to a query. This specification refers to an advertisement being "targeted" to a query when, for example, the advertisement is associated with a list of keywords that match one or more portions of the query. Accordingly, selecting a candidate advertisement that is targeted to a query may include generating n-grams from the query, and accessing a look-up table that cross-references n-grams with advertisements that are targeted to, or are otherwise associated with, a particular n-gram.

The mixer engine 106 may filter the candidate advertisements 124 before identifying the candidate advertisements to the auction engine 110. For instance the mixer engine 106 may filter duplicate advertisements, too many advertisements from the same advertiser, advertisements that have low satisfaction or interest scores, black-listed advertisements, or advertisements that are determined to be inappropriate for the user, advertisements that the user has indicated in their user preferences that they do not want to see, too many advertisements for the same query term, or other advertisements.

When an insufficient number of advertisements are selected, i.e. where the number of advertisements selected for a particular query does not satisfy a predetermined or dynamically determined threshold (e.g., "0", or "3"), the ad selector engine 109 may select additional advertisements, for example by broadening the advertisement selection parameters. Similarly, when too many advertisements are selected, i.e. where the number of advertisements selected for a particular query exceeds a different predetermined or dynamically determined threshold (e.g., "10", or "100"), the ad selector engine 109 may filter the selected advertisements, for example by narrowing the advertisement selection parameters. The query reviser engine 107 may also filter the candidate additional queries before identifying the additional queries to other components of the system in an attempt to filter out unhelpful suggestions prior to identifying ads.

The auction engine 110 selects a subset 125 of the candidate advertisements 124. For example, for each query terms, the auction engine 110 may perform a competition, i.e., an auction, in real-time to receiving the candidate advertisements 124, to select the top n advertisements for each query (i.e., initial query and each candidate query). Selecting a subset of the candidate advertisements may include selecting the same number of advertisements for each query, selecting different numbers of advertisements for each query, or determining, for a particular query, that no advertisements should be selected. In some implementations, because the suggested queries that were used to select the advertisements are diverse, and because the ad selector engine 109 may filter the candidate advertisements 124, the candidate advertisements 124 in the subset 125 of advertisements may also be diverse.

The search engine 111 searches for information that is accessible on the networks 104, thereby generating search results. The search engine 111 may perform a search using the initial query 120 only, using the initial query 120 and one or more of the additional queries 122, or using the initial query 120 and other data.

For privacy protection, any historical, behavioral or other data gathered can be made on an opt-in basis. Gathered data can be anonymized by various means. For example, the search engine 111 or query reviser engine 107 can provide additional query suggestions that are both relevant to the user's history while also protecting the user's privacy. For example, search history data can be anonymized for privacy protection, so that the data, if compromised, cannot be associated with a particular user or user identifier. Various anonymization processes, such as hashing, encryption and obfuscation techniques, can be used to ensure that subject privacy is protected.

In FIG. 1, a user of the client device 102 submits an initial search query 120 to the search engine front end 105 over the networks 104, during state (a). The user may submit the initial search query 120 by initiating a search dialogue on the client device 102, speaking or typing the terms of the initial search query 120, then pressing a search initiation button or control on the client device 102. The client device formulates the initial search query 120, and transmits the initial search query 120 over the networks 104.

Although this specification refers to the initial query 120 as an "initial" query, such reference is merely intended to distinguish this query from other queries, such as the additional, alternative, revised or suggested queries that are described below with respect to states (d) to (m). To be sure, the designation of the initial query 120 as "initial" is not intended to require the initial query 120 to be the first query that is entered by the user, or to be a query that is manually entered. For example, the initial query 120 may be the second or subsequent query entered by the user, or the initial query 120 may be automatically derived (e.g., by the query reviser engine 107) or may be modified based upon prior queries entered by the user, location information, and the like.

Furthermore, although state (a) describes an example where a user submits a search query, in other examples another type of request may be issued, such as a request for an advertisement. In a syndication example, an advertisement request may result in an ad block being sent to a user to be published on a page of content.

During state (b), the search engine front end 105 receives the initial query 120, and communicates the initial query 120 to the mixer engine 106. The search engine front end 105 may also append a flag to the initial query 120 to indicate that multiple advertisement blocks are to be included in the search engine results page 101. Alternatively, the mixer engine 106 may assign such a flag, or may attempt to generate advertisement blocks for all queries.

The mixer engine 106 obtains the initial query 120 and, during state (c), transmits the initial query 120 to the query reviser engine 107. The mixer engine 106 temporarily stores the initial query 120 and information identifying the client device 102, so that the resulting search engine results page 101 may be transmitted back to the client device 102.

During state (d), the query reviser engine 107 generates one or more additional queries 122 that relate to the initial query 120, and transmits the additional queries 122 to the mixer engine 106. In some implementations, the additional queries may be selected based the relevance of the additional queries to the initial query 120, based an extent to which the selected additional queries are diverse with each other, and/or based on the commerciality of the additional queries, i.e., the business value of the additional queries to the search engine provider. Generating additional queries may include generating candidate additional queries, and selecting a subset of the candidate additional queries based on any number of factors, including relevancy, diversity and/or commerciality. The mixer engine 101 temporarily stores information identifying the initial query 120 and the additional queries 122.

During state (e), the mixer engine 106 transmits the initial search query 120 and the additional queries 122 to the ad selector engine 109. The ad selector engine 109 selects one or more candidate advertisements that are targeted to the initial search query 120, and one or more candidate advertisements that are targeted to the additional queries 122. For example, the ad selector engine 109 may select one or more candidate advertisements 124 that are targeted to each of the additional queries 122, where some of the selected advertisements 124 may be targeted to more than one of the queries. The candidate ads for each query may be identified as candidates based on, for example, relevance to the query, ad quality, non-duplicative quality of the ad or advertiser, and/or a threshold number of ads to be selected as candidates. During state (f), the ad selector engine 109 transmits the selected advertisements 124, or information referencing the selected advertisements 124, to the mixer engine 106. The mixer engine 106 temporarily stores information referencing the selected advertisements 124.

During state (g), the mixer engine 106 transmits the selected advertisements, or information referencing the selected advertisements, to the auction engine 110. The auction engine 110 selects one or more subsets 125 of the advertisements using an auction such as, for example, a modified second price auction determining bids based on factors such as but not limited to advertiser maximum bid amounts, ad quality, ad click through rates, and, during state (h), transmits the advertisements of the subsets 125, or information referencing the advertisements of the subset 125, to the mixer engine 106. The mixer engine 106 temporarily stores information referencing the advertisements of the subset 125.

During state (i), the mixer engine 106 transmits the initial query 120 and, optionally, the additional queries 122 to the search engine 111. The search engine 111 generates search results that it identifies as being relevant to the initial query 120 and, if provided, one or more of the additional queries 122. In some implementations, during state (j), the search engine transmits the search results 126 to the mixer engine 106, which generates the search engine results page 101 that includes a reference 129 to the initial query 120 and references 130A-B to the additional queries, and that includes advertisements 131 from the subset 125 that are targeted to the initial query 120, advertisements 132 from the subset 125 that are targeted to a first additional query 122A, and advertisements 134 from the subset 125 that are targeted to a second additional query 122B.

The mixer engine 106 generates the search engine results page 101 using the information that it temporarily stored during states (b) to (k). In some implementations the search results may be generated while or before the auction engine 110 generated the subsets 125.

During state (k), the mixer engine 106 transmits code 135 (e.g., HyperText Markup Language code or eXtensible Markup Language code) for the search engine results page 101 to the search engine front end 105 which, during state (I), transmits the code 135 to the client device 102 over the networks 104, so the client device 102 can display the search engine results page 101.

The client device 102 invokes the code 135 (e.g., using a layout engine) and, as a result, displays the search engine results page 101 on the display 119. The initial query 120 is displayed in a query box (or "search box") 136, located for example, on the top of the search engine results page 101, and the search results 126 are displayed in a search results block 137, for example on the left hand side of the search engine results page 101. In some implementations, the right hand side of the search engine results page 101 defines an advertising region, including the reference 129 to the initial query 120, the reference 130A to the first additional query 122A, and the reference 130B to the second additional query 122B.

A first advertisement block 139 includes the reference 129 to the initial query 120 and the advertisements 131 of the subset 125 that are targeted to the initial query 120. A second advertisement block 140 includes the reference 130A to the first additional query 122A and the advertisements 132 of the subset 125 that are targeted to the first additional query 122A. A third advertisement block 141 includes the reference 130B to the second additional query 122B and the advertisements 134 of the subset 125 that are targeted to the second additional query 122B.

The references 129, 130 may be textual or graphical references, or the references 129, 130 may include hyperlinks that, when selected, cause the client device 102 to submit a new initial search query that includes, as a query term(s), the query associated with the hyperlink. In doing so, a reference 130 to an additional query 122 may be used to initiate a new search query using the additional query 122.

Figure 2A:
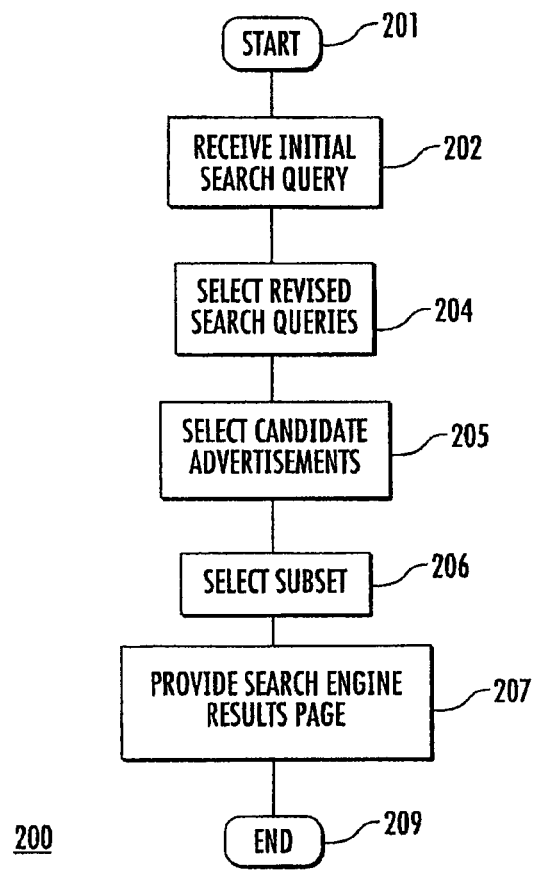
FIGS. 2A and 2B are flowcharts of example processes.

FIG. 2A is a flowchart of an example process 200. Briefly, the process 200 includes receiving an initial query, selecting one or more additional queries that relate to the initial query, selecting one or more advertisements that are relevant to the initial query, and one or more advertisements that are relevant to each additional query, selecting a subset of the advertisements, and providing a search engine results page that includes a reference to the initial query and to each additional query, and that includes advertisements from the subset that are targeted to the initial query, and advertisements from the subset that are targeted to each additional query.

In more detail, when the process 200 begins (201), an initial query is received (202). The initial query may be included in a search query (e.g., a text-based query, a voice query, or an image query) that the user submits through a client device, such as a desktop computer or a smart phone. Other data, such as context data, browser header data, previous user queries, location data, user interest data, web history, and the like, may also be received with the initial query.

One or more additional queries that relate to the initial query are selected (204). Revised query terms may be obtained by applying an initial query to a query revision model that identifies additional queries that match a same context as the initial query. For example, additional queries may be obtained by applying a synonym model which replaces portions of the initial query with synonyms of those portions.

Selecting additional queries may include generating multiple candidate additional queries, and filtering or otherwise excluding particular candidate additional queries. For instance, as a result of applying a semantic drift detection process to a particular candidate additional query, a query reviser engine may determine that semantic drift has occurred, and the particular candidate additional query may be filtered. Duplicate candidate additional queries, candidate additional queries that do not exhibit sufficient diversity or commerciality i.e., as reflected in a diversity or commerciality score, or other candidate additional queries may also be filtered when selecting additional queries.

In some implementations, one or more advertisements that are relevant to the initial query are selected, as are one or more advertisements that are relevant to each additional query (205). Selecting an advertisement may include selecting advertisements that are associated with keywords that make up the query, and/or filtering advertisements that are unlikely to be selected by the user (e.g., duplicate or inappropriate advertisements).

A subset of the advertisements is selected (206). Selecting the subset may include selecting a number n of advertisements to be shown in a display block for each query (e.g., "3" for each query, or "1" for the initial query and "2" each for the additional queries), and selecting, as the subset, the n advertisements that have the highest quality. Other criteria can be used, such as advertisements whose advertisers have bid the highest amount of money to be displayed on the search engine results page. For example, the advertisements that have the highest effective ad ranking taking into account advertiser maximum bid (typically in cost-per-click terms), ad quality, ad click-through-rate (such as for each candidate ad relative to the next highest bid ad), and the like for each candidate ad in the subset of advertisements selected for potential display for a particular query. The selection of an advertisement for one query may affect the selection of an advertisement for another query, for example to exclude duplicate advertisements or advertisements from the same advertiser on the same search engine results page.

A search engine results page is provided that includes a reference to the initial query and to each additional query, and that includes advertisements from the subset that are targeted to the initial query, and advertisements from the subset that are targeted to each additional query (207), thereby ending the process 200 (209). The reference to each query may be a textual reference, or may be a hyperlink that, when selected, submits a new search query using a query (e.g., the terms) that is (are) identified by the hyperlink. A result may also be a script or link that activates a web-based application (including a specialized search application such as a map search, product search, video playback, Adobe Flash or HTML5 content, and the like), or client software when authorized by the user. The references and advertisements may be displayed in an advertising region of the search engine results page, such as along the bottom or the right hand side of the search engine results page.

In some implementations, the references to the initial query and to each additional query are displayed, but no advertisements are displayed for the initial query, or for one or more of the additional queries. In such implementations, a control on the search engine results page may be selected by the user to cause some advertisements, or additional advertisements, to be displayed. In some implementations, advertisements are displayed for the initial query and for the additional queries, but no reference is displayed for the initial query, or for one or more of the additional queries.

Figure 2B:
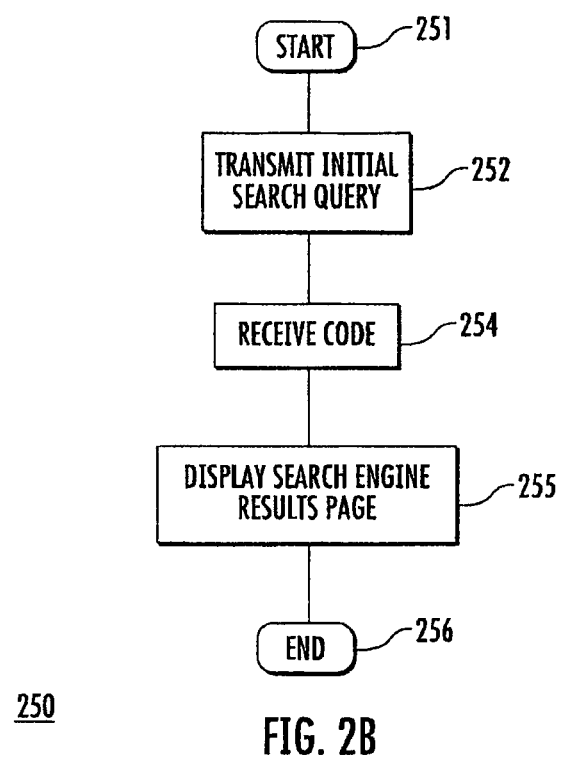

FIG. 2B is a flowchart of an example process 250. Briefly, the process 250 includes transmitting, by a client device, an initial query, receiving, by the client device, code for a search engine results page that includes a reference to the initial query and to one or more additional queries that relate to the initial query, and that further includes one or more advertisements that are relevant to the initial query, and one or more advertisements that are relevant to each additional query, and displaying, by the client device, the search engine results page.

In more detail, when the process 250 begins (251), a client device transmits an initial query (252). The search query may be transmitted over a network, for example when the user enters text into a query box on the user interface of the client device, and selects a control to submit the initial query. Alternatively, the initial query may be submitted without requiring a user interaction, for example when the client device recognizes a query term from the speech of a user, or uses the current location of the mobile device as a query term, and automatically submits the initial query to the search engine to obtain information for display before the user asks for it.

The client device receives code for a search engine results page that includes a reference to the initial query and to one or more additional queries that relate to the initial query, and that further includes one or more advertisements that are relevant to the initial query, and one or more advertisements that are relevant to each additional query (254). The code may be markup language code, such as HTML or XML code, that may be interpreted by a layout engine or a browser. The client device displays the search engine results page (255), thereby ending the process 250 (256).

FIGS. 3A to 3G show example search engine results pages 300, 310, 320, 330, and 340, respectively. The search engine results pages 300, 310, 320, 330, and 340 illustrate several ways in which the references to the queries and the various respective advertisements for each query may be arranged.

Figure 3A:
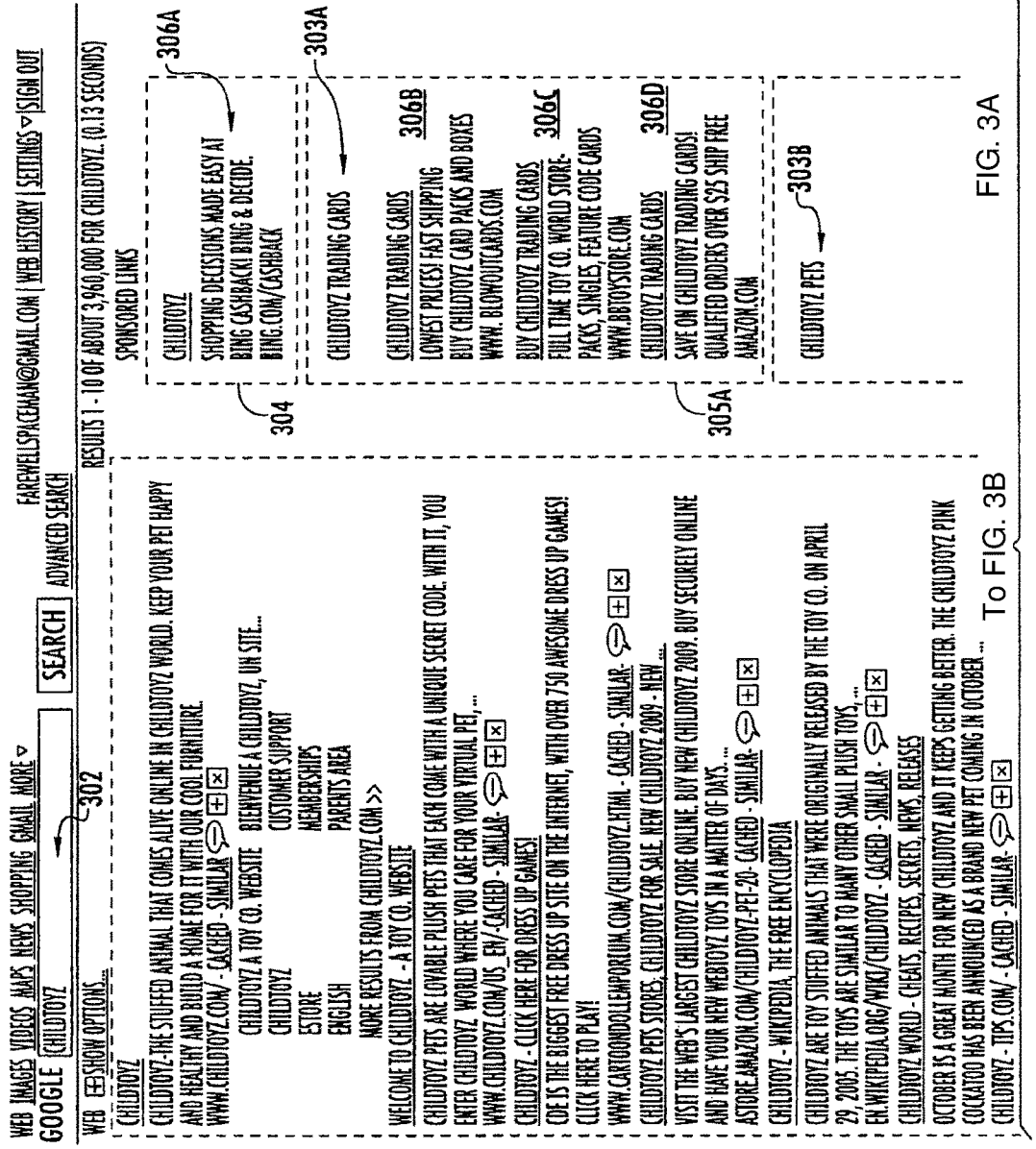

In FIGS. 3A and 3B, the search engine results page 300 includes a search results block 301 that includes search results that a search engine has identified as being relevant to the initial query 302 (in the figure, "childztoyz"). The search engine results page also includes references 303A to 303C to each additional query (in the figure, "childztoyz trading cards," "childztoyz pets," and "childztoyz charms," respectively). The search engine results page 300 also includes an advertising block 304 that includes an advertisement 306A that is targeted to the initial query 302, an advertising block 305A that includes reference 303A and advertisements 306B-D that are targeted to the additional query 303A, an advertising block 305B that includes reference 306B and advertisements 306E-F that are targeted to the additional query 303B, and an advertising block 305C that includes reference 303C and advertisements 306G-H that are targeted to the additional query 303C. Notably, the search engine results page 300 does not include a reference that references the initial query 302 directly above the advertising block 304. The additional advertising blocks may be displayed in order of, for example, relevance of each additional query to the initial query, historical click through rate for the ads in each ad block, number of ads available for each ad block, random placement, and the like.

Figure 3C:
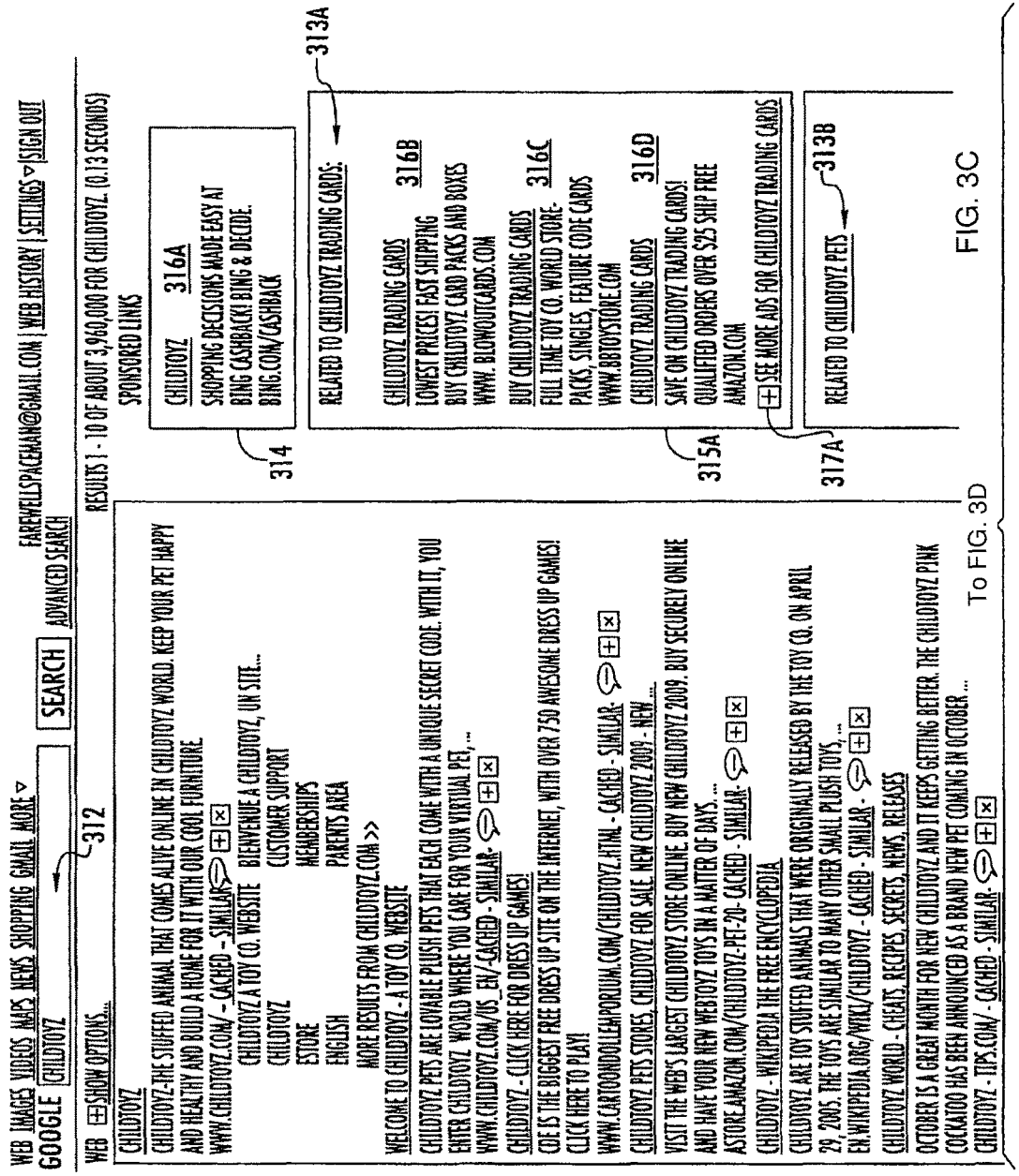

In FIGS. 3C and 3D, the search engine results page 310 includes a search results block 311 that includes search results that a search engine has identified as being relevant to the initial query 312 (in the figure, "childztoyz"). The search engine results page also includes references 313A-C to each additional query (in the figure, "childztoyz trading cards," "childztoyz pets," and "childztoyz charms," respectively). The search engine results page 310 also includes an advertising block 314 that includes an advertisement 316A that is targeted to the initial query 312, an advertising block 315A that includes the reference 313A and advertisements 316B-D that are targeted to the additional query 313A, an advertising block 315B that includes reference 313B and advertisements 316E-F that are targeted to the additional query 313B, and an advertising block 315C that includes the reference 313C and advertisements 316G-H that are targeted to the additional query 313C.

Notably, and instead of merely including static textual data, the references 313A-C each define hyperlinks that, when selected by the user, initiate a new search query using the additional query. Moreover, the advertising blocks 315A-C include controls 317A-C, respectively, that, when selected, cause additional advertisements that are targeted to the corresponding additional queries to be obtained and/or displayed, or that cause some advertisements to be obtained or displayed if none are shown. Although the controls 317A-C are illustrated as user-selectable boxes that reveal additional content to the user (sometimes referred to as a "plusbox"), other types of controls may also be used.

Figure 3E:
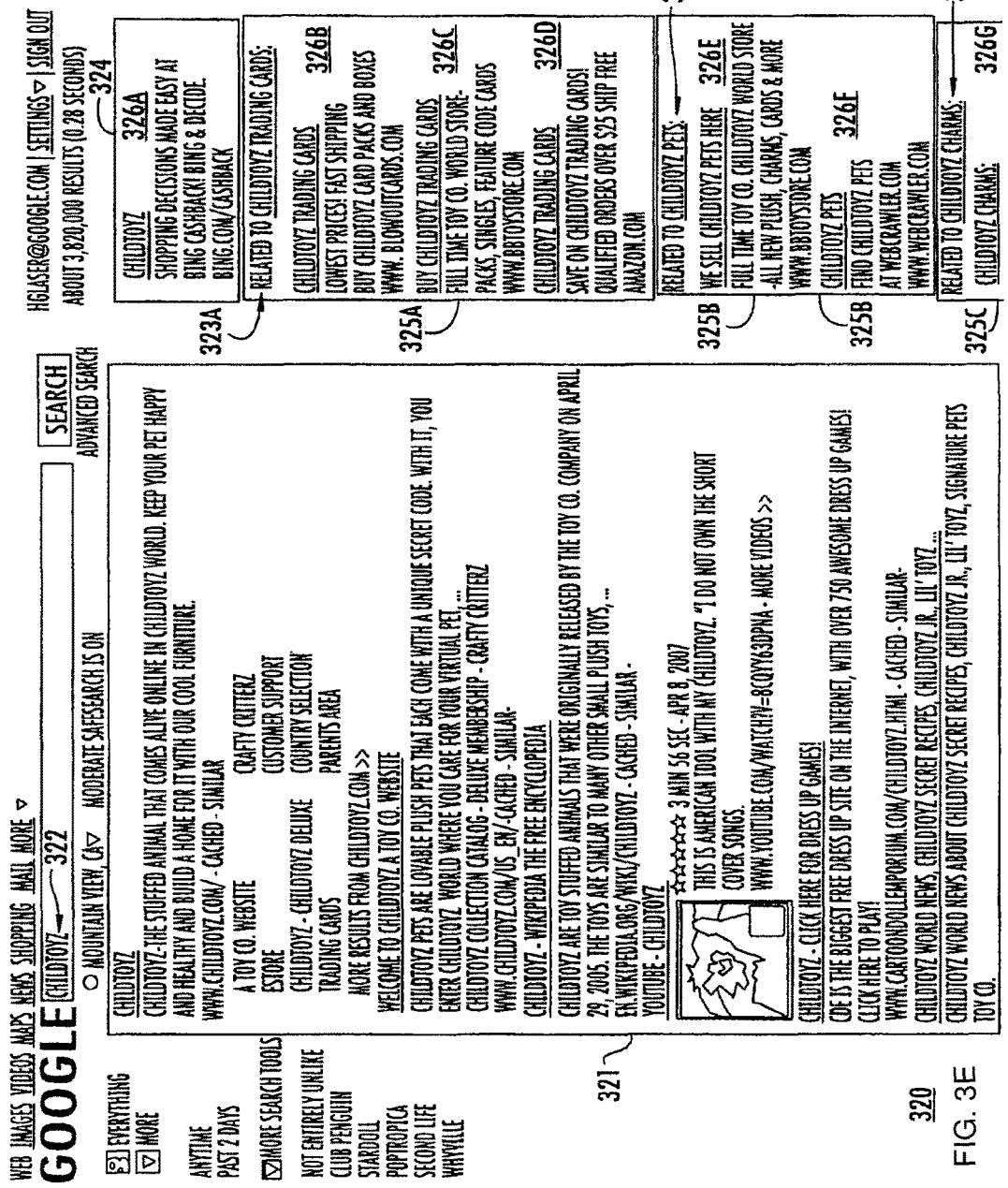

In FIG. 3E, the search engine results page 320 includes a search results block 321 that includes search results that a search engine has identified as being relevant to the initial query 322 (in the figure, "childztoyz"). The search engine results page also includes references 323A-C to each additional query (in the figure, "childztoyz trading cards," "childztoyz pets," and "childztoyz charms," respectively). The search engine results page 320 also includes an advertising block 324 that includes an advertisement 326A that is targeted to the initial query 322, an advertising block 325A that includes the reference 323A and advertisements 326B-D that are targeted to the additional query 323A, an advertising block 325B that includes the reference 323B and advertisements 326E-F that are targeted to the additional query 323B, and an advertising block 325C that includes the reference 323C and advertisement 326G that is targeted to the additional query 323C. Notably, the references 323A-C are, in some implementations, displayed in a larger font than the references 313A-C of FIG. 3B, to allow the user to see the additional queries more easily.

Figure 3F:
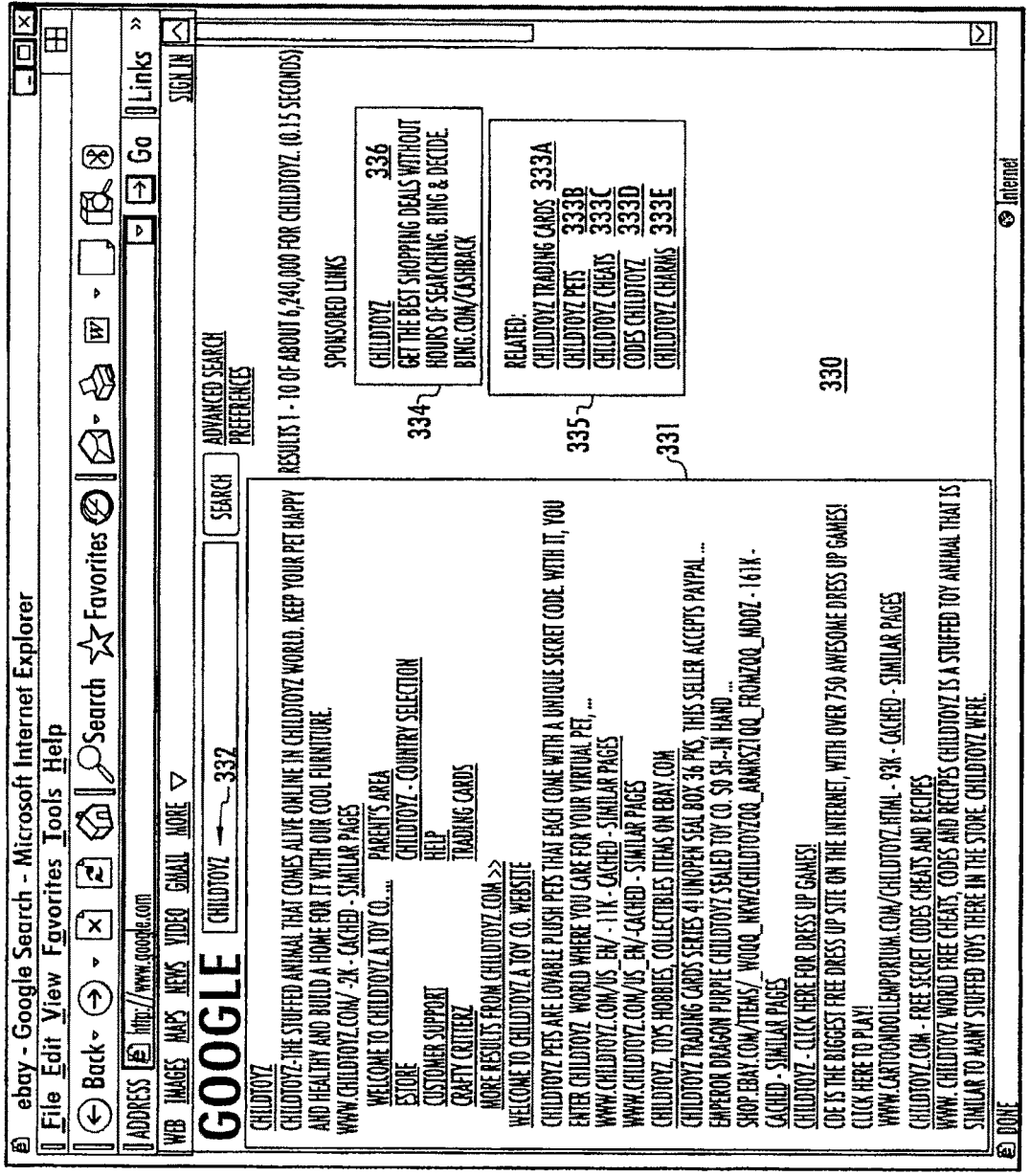

In FIG. 3F, the search engine results page 330 includes a search results block 331 that includes search results that a search engine has identified as being relevant to the initial query 332 (in the figure, "childztoyz"). The search engine results page also includes references 333A-E to each additional query (in the figure, "childztoyz trading cards," "childztoyz pets," "childztoyz cheats," "codes childztoyz," and "childztoyz charms," respectively). The search engine results page 330 also includes an advertising block 334 that includes an advertisement 336 that is targeted to the initial query 332.

The search engine results page 330 also includes a suggested query term block 335 that references the additional queries 333A-E, however the suggested query term block 335 does not include advertisements or advertisement blocks that are targeted to the additional queries 333A-E. The auction engine, ad selector engine, or mixer engine may choose to not include advertising blocks if an insufficient number of advertisements are located, or if, for example, the selected advertisements do not satisfy predetermined relevancy and/or diversity scores. For example, advertisements may not be included in the search engine results page 330 if the auction engine, ad selector engine, or mixer engine determine that the revised queries do not share a common context, i.e., a semantic drift has occurred. Semantic drift can be determined by, for example, a particularly low relevance or low click-through-rate for a particular revised query with respect to an initial query.

Figure 3G:
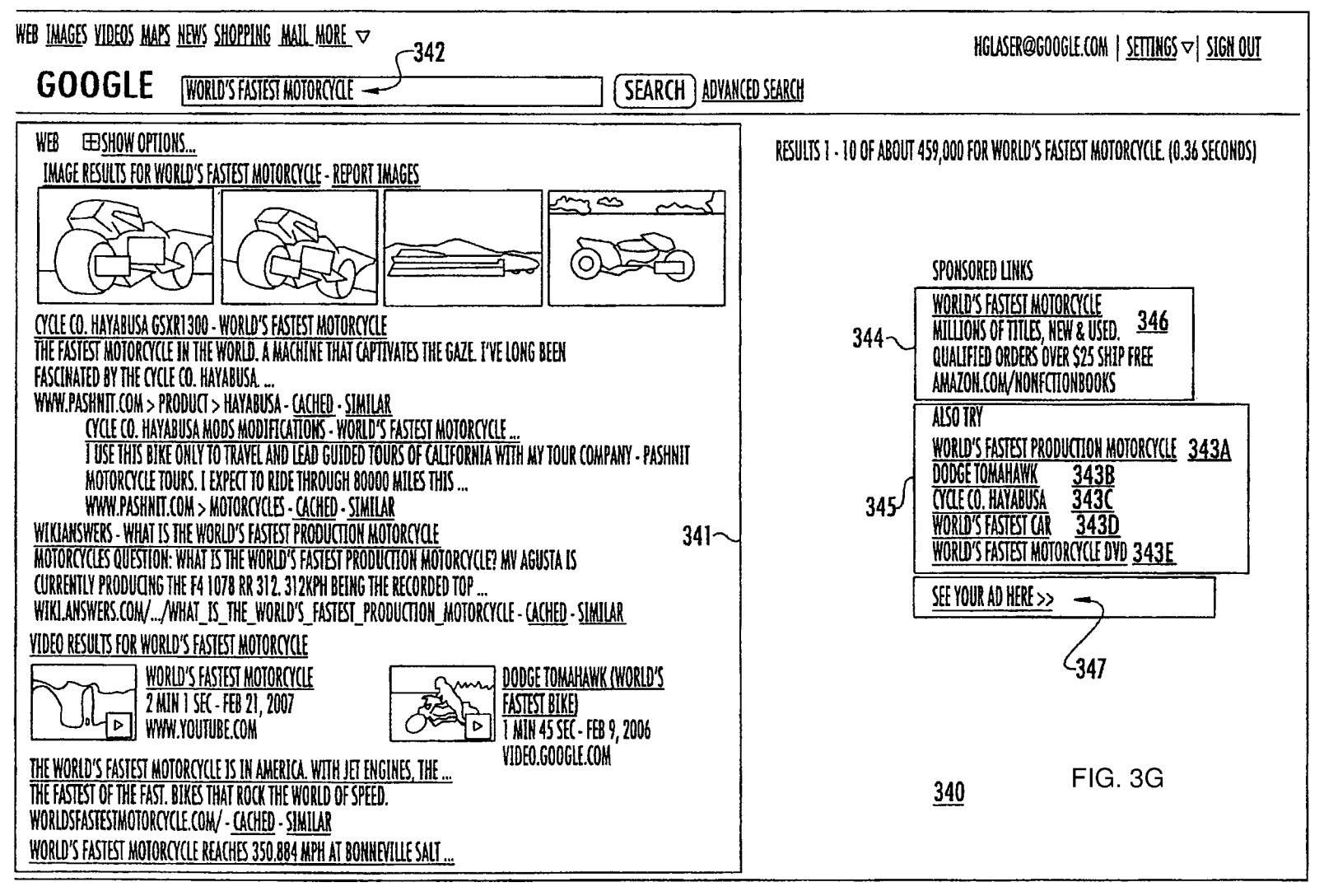

In FIG. 3G, the search engine results page 340 includes a search results block 341 that includes search results that a search engine has identified as being relevant to the initial query 342 (in the figure, "world's fastest motorcycle"). The search engine results page also includes references 343A-E to each additional query (in the figure, "world's fastest production motorcycle," "dodge tomahawk," "Suzuki hayabusa," "world's fastest car," and "world's fastest motorcycle dvd," respectively). The search engine results page 340 also includes an advertising block 344 that includes an advertisement 346 that is targeted to the initial query 342.

The search engine results page 340 also includes an additional query block 345 that references the additional queries 343A-E, however the additional query block 345 does not include advertisements that are targeted to the additional queries 343A-E. The auction engine, ad selector engine, or mixer engine may choose to not include advertising blocks if, for example, an insufficient number of advertisements are located, or if the selected advertisements do not satisfy predetermined relevancy and/or diversity scores. For example, advertisements may not be included in the search engine results page 340 if the auction engine, ad selector engine, or mixer engine determine that the revised queries do not share a common context, i.e., a semantic drift has occurred. Notably, however, the search engine results page 340 includes an auction participation link 347 that, when selected by the user, establishes a dialogue to invite the user to submit advertisements that may be displayed in an advertisement block for future search queries.

As described above, one or more additional queries can be identified and then content associated therewith can be provided in a block along with a respective additional query. Additional queries can be selected, for example, based on contextual relevance. Other considerations are possible, for example, considerations relating to utility, diversity and commerciality among others.

Figure 4A:
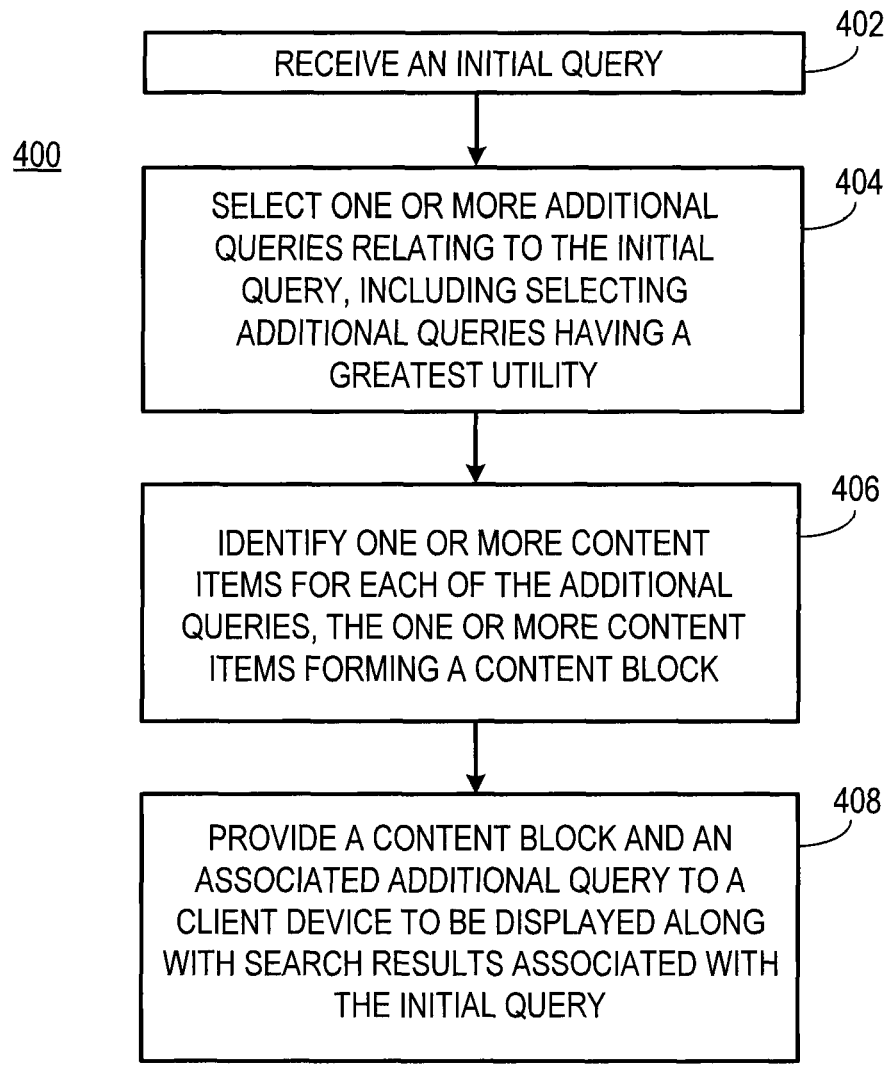
FIGS. 4A to 4C are flowcharts of example processes.

FIG. 4A is a flowchart of an example process 400. Briefly, the process 400 includes receiving an initial query; selecting one or more additional queries relating to the initial query, including selecting additional queries having a greatest commerciality; identifying one or more content items for each of the additional queries, the one or more content items forming a content block; and providing a content block and an associated additional query to a client device to be displayed along with search results associated with the initial query.

In more detail, an initial query is received (402). For example, the search engine front end 105 can receive an initial query. The initial query may be included in a search query (e.g., a voice query) that the user submits through a client device 102, such as a desktop computer or a smart phone. Other data, such as context data, may also be received with the initial query.

In some implementations, the additional query includes one or more terms from the initial query. For example, if the initial query is "childztoyz," the additional query can include the term "childztoyz" along with one or more additional terms.

One or more additional queries relating to the initial query are selected, including additional queries having a greatest commerciality (404). For example, the query reviser engine 107 can select one or more additional queries relating to the initial query.

In some implementations, the commerciality is a measure of content or quality of the content associated with an additional query. For example, if five search results are responsive to a query A, and ten search results are responsive to a query B, the measure can be based at least in part on the number of search results associated with a given query. Other measures of commerciality are possible.

In some implementations, the commerciality is a measure of the terms associated with the additional query. That is, in some implementations, the terms or keywords that are associated with a given query can be evaluated for commerciality considerations. For example, an additional query that includes the name of a commercial product, and hence is indicative that one or more content items associated with the given query will themselves be related to the specific commercial product, may have be deemed to have a high level of commerciality.

In some implementations, commerciality is measured by, for example, historical performance on, for example an opt-in basis, of one or more content items that are displayed with results when the additional query is received. The historical performance can include whether the content item displayed with the results is associated with a higher click-through-rate or conversion when the additional query is used as the search query.

In some implementations, the commerciality is based on one or more signals. In some implementations, the utility can include commerciality considerations. The commerciality considerations can include an evaluation of a commercial nature of the additional query, past performance of content items that are shown with a given query, an amount of revenue generated from a respective additional query or other commercial considerations. For example, the query reviser 107 can determine conversions on an opt-in basis associated with advertisements displayed with search results resulting from the respective additional queries. The revenue generated from the conversion can be calculated.

The commercial considerations can be weighted depending on for example, a number of content items, or advertisements, shown in response to each respective additional query, a location (e.g., top location, in a block, or bottom location) or other considerations. Each respective additional query can be associated with a score. For example, a query for "dog treats" may identify two hundred advertisements whereas a query for "cat nail cutter" may only identify fifty advertisements. The score for each query can be weighted, for example, based on the number of the advertisements identified.

The commercial considerations can also include whether a long click or short click is associated with the content items. Weightings can be based on an amount of time a user remained on a landing page associated with the content item.

The commerciality considerations can also include whether or not any commerce results are associated with the content items resulting from a search using the respective additional query. For example, a top number of the search results resulting from the respective additional query can be analyzed to determine if any commerce keywords can be found in the search result. For example, if keywords such as "buy" "sell" or terms associated with commerce are included in the search results. A weight can be given to the additional query based at least in part on, for example, the number of keywords associated with commerce in the search results.

While various signals, or commerciality considerations, have been described with respect to evaluating the commerciality of a given query or content associated with a query, other signals or combinations of signals can be used to determine whether a commerciality constraint or criteria has been satisfied. In addition, commerciality can be used as a factor in selecting additional queries, such as when determining a quality of a given additional query or its associated content items for consideration as a part of an auction.

In some implementations, a graph is generated representing possible paths from the initial query to other queries, the graph including nodes where each node represents a potential next query and where edges of the graph include weights that reflect a probability that a successor node follows a predecessor node in a search session. For example, the query reviser engine 107 can generate the graph.

In some implementations, a query session is defined as a sequence of search queries issued by a certain user for some specific information need, i.e. <User, Timestamp, Query>i. Session logs can be segmented by the timestamps, i.e., if the time interval between two adjacent queries are longer than a threshold, they are segmented into two sessions, and the first one is the end of the previous session, and the second one is the beginning of the latter session. Session information can be collected on an opt-in basis.

Figure 4B:
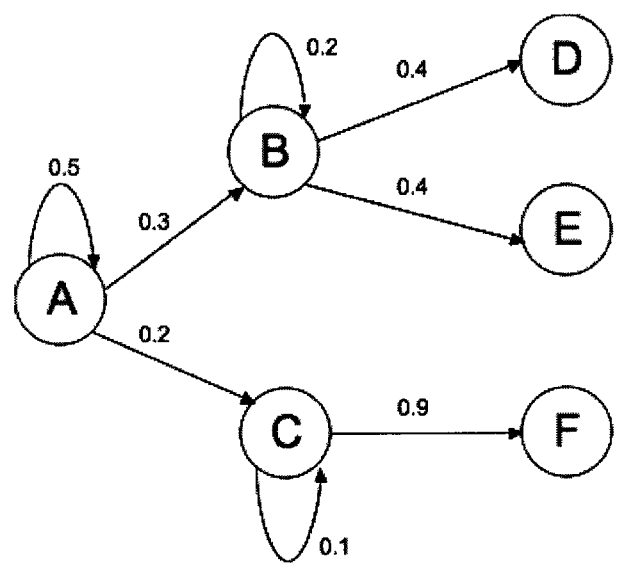

Suppose G=(E, V) is the graph of additional queries (sometimes referred to as "manual refinements"), where the vertices correspond to all queries that users have entered. Between any two vertices i and j, the query reviser 107 can place an edge e(i, j) if a user ever typed query j after query i in the same session. For example, the graph may look as shown in FIG. 4B.

In some implementations, the various refinements j that immediately follow a query i, i.e., there exists an edge e(i, j) connecting i and j, are ordered by the number of search long clicks on the refinement j conditioned on it appearing immediately after the query i, and showing the top K refinements in this order.

In some implementations, the commerciality can be calculated using the commerciality signals and the graph above. Suppose an intrinsic commerciality of a query a is represented as C(q). C(q) can incorporate any number or combination of the commerciality signals described above.

As described above, the refinement process can be modeled as a random walk on the graph of manual refinements. Let P(i, j)=probability that the user refined to query j after query i. Further, let P(i, i) represent the probability that a user's search session ends at query i, and the user does not refine any more. These probabilities can be inferred from the session logs, for example, on an opt-in basis.

In some implementations, the refinements j that follow a query i by E(i, j)=P(i,j)C(j) can be ranked and the refinements with the top values of E(i, j) can be shown as the most commercial.

In some implementations, suggestions j that users directly refined to, as well as suggestions that users may not have directly refined to, but would have had a high probability of refining to in their session are considered. For example, in the graph above, A might refine to B and C with probability 0.3 and 0.2 respectively. F always follows C with probability 0.9, and is thus, a reasonable candidate as a related commercial suggestion for A in addition to direct manual refinements B and C.

In some implementations, If P(i, j) is a transition matrix corresponding to the graph G, consider the transition matrix $P^{\{n\}}$ (i.e. P*P*P* . . . n times). This corresponds to propagating the refinement labels n-hops outward along the refinement graph. Specifically, $P^{\{n\}}(i, j)$ corresponds to the probability of manually refining from query i to refinement j on a path of length <=n. Given the commerciality signal C(j), the query reviser 107 can then rank the suggestions by $E(i, j)=P^{\wedge}\{n\}(i, j)C(j)$ and show the refinements with the top values of $E(i, j)$. This approach propagates path probabilities along the session refinement graph, and captures the intuition that the immediate next refinements may not always necessarily be more commercial, but may be followed by commercial queries.

In some implementations, the commerciality labels are propagated on each vertex in each iteration of the propagation in addition to propagating the path probabilities. For each query j, the query reviser engine 107 solves the following iterative dynamic programming recursion: $\circ E^{\wedge}\{0\}(j)=C(j) \circ E^{\wedge}\{n\}(j)=sum\_\{j'\} \ P^{\wedge}\{n\}(j, \ j') \ E^{\wedge}\{n-1\}(j, j')$.

In matrix form, the query reviser engine 107 can initialize the column vector $E^{\wedge}\{0\}=[C(j)]$. The nth iteration is the matrix multiplication: $E^{\wedge}\{n\}=P. \ E^{\wedge}\{n-1\}$ After n iterations, $E^{\wedge}\{n\}(j)$ can be interpreted as the expected commerciality one would encounter if one started a Markov random walk at node j and continued the random walk for n iterations on the session refinement graph. Once the query reviser engine 107 has computed the $E^{\wedge}\{n\}(j)$, the query reviser engine 107 pick the refinements j that maximize $p(i, j)E^{\wedge}\{n\}(j)$.

One or more content items are identified for each of the additional queries, the one or more content items forming a content block (406). For example, the ad selector engine 109 can identify one or more content items for each additional query. In some implementations, the content items include advertisements. Selecting an advertisement may include selecting advertisements that are associated with keywords that make up the query, and/or filtering advertisements that are unlikely to be selected by the user (e.g., duplicate or inappropriate advertisements). Other criteria can be used, such as advertisements whose advertisers have bid the highest amount of money to be displayed, for example, on the search engine results page. The selection of an advertisement for one query may affect the selection of an advertisement for another query, for example to exclude duplicate advertisements or advertisements from the same advertiser on the same search engine results page.

A content block and an associated additional query are provided, such as to a client device to be displayed along with search results associated with the initial query (408). For example, the query reviser 107 can provide the content block and an associated additional query to the client device 102. For example, the content block and the associated additional query can be displayed in an advertising region of the search engine results page displayed on a client device 102, such as along the bottom or the right hand side of the search engine results page.

Figure 4C:
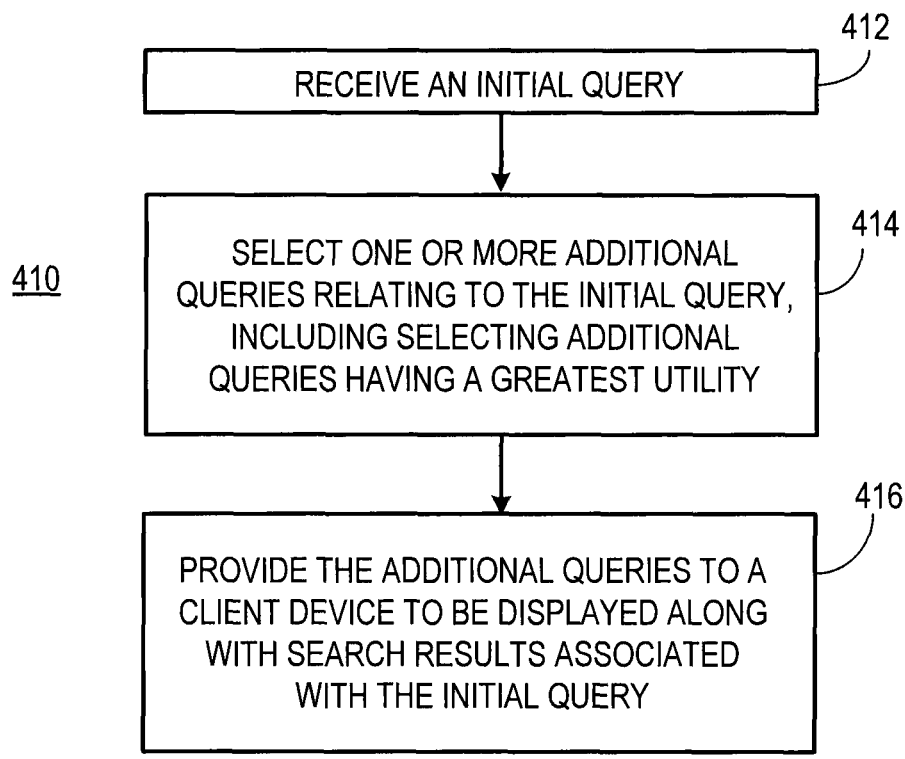

FIG. 4C is a flowchart of an example process 410. Briefly, the process 410 includes receiving an initial query; selecting one or more additional queries relating to the initial query, including selecting additional queries having a greatest commerciality; and providing the additional queries to be displayed along with search results associated with the initial query.

In more detail, an initial query is received (412). For example, the search engine front end 105 can receive an initial query. As described above, the initial query may be included in a search query (e.g., a voice query) that the user submits through a client device 102, and can include other data, such as context data, may also be received with the initial query.

One or more additional queries relating to the initial query are selected, including additional queries having a greatest commerciality (414). For example, the query reviser engine 107 can select one or more additional queries relating to the initial query.

In some implementations, the commerciality is a measure of content or quality of the content associated with an additional query as described above. In some implementations, the commerciality is a measure of the terms associated with the additional query as described above. In some implementations, commerciality is measured by historical performance on, for example an opt-in basis, of one or more content items that are displayed with results when the additional query is received as described above. In some implementations, the commerciality is based on one or more signals. The signals can be the same or different than the signals described above with respect to the commerciality considerations In some implementations, performance data associated with content items presented along with a given additional query can be determined, for example on an opt-in basis. For example, the query reviser engine 107 can determine the performance data associated with the content items. The performance data can include a click-through-rate associated with the content item or a conversion rate associated with the content item. The query reviser engine 107 can determine whether the click-through-rate or a conversion associated with a content item increased after being presented along with a given additional query.

The additional queries are provided for further processing, such as to a client device to be displayed along with search results associated with the initial query (416). For example, the query reviser engine 107 can provide the additional queries to be displayed along with search results that are responsive to the initial query at the client device 102 as described above.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode data for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:
1. A method comprising:
 receiving, from a user device, an initial query submitted by a current user;
 identifying additional queries relating to the initial query;
 identifying advertisements using the additional queries from an inventory of advertisements;

determining a respective measure of commerciality for each additional query based at least in part on how often users have submitted the additional query following submission of the initial query and an estimated amount of revenue that will be generated by providing one or more of the advertisements identified for the additional query;

selecting, from among the additional queries, a second query based on the second query having a highest measure of commerciality among the additional queries; and updating a user interface of the user device, to incorporate a presentation of the second query with content blocks, including:

populating a first content block with one or more of the additional queries;

omitting, from the user interface presented responsive to the initial query, a second content block that presents one or more of the advertisements identified using the second query when semantic drift between the initial query and the second query has occurred.

2. The method of claim 1, wherein identifying the additional queries relating to the initial query comprises:

determining, for each of a plurality of queries, a respective likelihood that the query would be a final query in a series of query refinements from the initial query in a query session; and identifying one or more of the plurality of queries having a highest likelihood.

3. The method of claim 1, wherein updating the user interface includes including in a given content block text identifying the initial search query and an advertisement that was selected using the initial search query.

4. The method of claim 1, wherein updating the user interface includes including in a given content block text identifying the second search query and an advertisement that was selected using the second search query when there is a lack of semantic drift, wherein the given content block is visually distinguished from the search results.

5. The method of claim 1, wherein identifying advertisements using the additional queries comprises identifying multiple advertisements using each of at least two of the additional queries.

6. The method of claim 5, wherein updating the user interface includes including multiple different advertisements identified using one of the at least two additional queries in a same content block as text identifying the one of the at least two additional queries.

7. The method of claim 1, wherein the presentation of the second query that is included in the user interface includes a hyperlink that submits the second query to a search engine in response to user interaction with the second query.

8. A system comprising:

one or more computers and one or more storage devices storing instructions that, when executed by the one or more computers, cause the one or more computers to perform operations comprising:

receiving, from a user device, an initial query submitted by a current user;

identifying additional queries relating to the initial query;

identifying advertisements using the additional queries from an inventory of advertisements;

determining a respective measure of commerciality for each additional query based at least in part on how often users have submitted the additional query following submission of the initial query and an estimated amount of revenue that will be generated by providing one or more of the advertisements identified for the additional query;

selecting, from among the additional queries, a second query based on the second query having a highest measure of commerciality among the additional queries; and updating a user interface of the user device to incorporate a presentation of the second query with content blocks, including:

populating a first content block with one or more of the additional queries;

omitting, from the user interface presented responsive to the initial query, a second content block that presents one or more of the advertisements identified using the second query when semantic drift between the initial query and the second query has occurred.

9. The system of claim 8, wherein identifying the additional queries relating to the initial query comprises:

determining, for each of a plurality of queries, a respective likelihood that the query would be a final query in a series of query refinements from the initial query in a query session; and identifying one or more of the plurality of queries having a highest likelihood.

10. The system of claim 8, wherein updating the user interface includes including in a given content block text identifying the initial search query and an advertisement that was selected using the initial search query.

11. The system of claim 8, wherein updating the user interface includes including in a given content block text identifying the second search query and an advertisement that was selected using the second search query when there is a lack of semantic drift, wherein the given content block is visually distinguished from the search results.

12. The system of claim 8, wherein identifying advertisements using the additional queries comprises identifying multiple advertisements using each of at least two of the additional queries.

13. The system of claim 12, wherein updating the user interface includes including multiple different advertisements identified using one of the at least two additional queries in a same content block as text identifying the one of the at least two additional queries.

14. The system of claim 8, wherein the presentation of the second query that is included in the user interface includes a hyperlink that submits the second query to a search engine in response to user interaction with the second query.

15. A non-transitory computer storage media storing instructions that when executed by one or more computers cause the one or more computers to perform operations comprising:

receiving, from a user device, an initial query submitted by a current user;

identifying additional queries relating to the initial query;

identifying advertisements using the additional queries from an inventory of advertisements;

determining a respective measure of commerciality for each additional query based at least in part on how often users have submitted the additional query following submission of the initial query and an estimated amount of revenue that will be generated by providing one or more of the advertisements identified for the additional query;

selecting, from among the additional queries, a second query based on the second query having a highest measure of commerciality among the additional queries; and updating a user interface of the user device to incorporate a presentation of the second query with content blocks, including:

populating a first content block with one or more of the additional queries;

omitting, from the user interface presented responsive to the initial query, a second content block that presents one or more of the advertisements identified using the second query when semantic drift between the initial query and the second query has occurred.

16. The computer storage media of claim 15, wherein identifying the additional queries relating to the initial query comprises:

determining, for each of a plurality of queries, a respective likelihood that the query would be a final query in a series of query refinements from the initial query in a query session; and identifying one or more of the plurality of queries having a highest likelihood.

17. The computer storage media of claim 15, wherein updating the user interface includes including in a given content block text identifying the initial search query and an advertisement that was selected using the initial search query.

18. The computer storage media of claim 15, wherein updating the user interface includes including in a given content block text identifying the second search query and an advertisement that was selected using the second search query when there is a lack of semantic drift, wherein the given content block is visually distinguished from the search results.

19. The computer storage media of claim 15, wherein identifying advertisements using the additional queries comprises identifying multiple advertisements using each of at least two of the additional queries.

20. The computer storage media of claim 15, wherein the presentation of the second query that is included in the user interface includes a hyperlink that submits the second query to a search engine in response to user interaction with the second query.

* * * * *

UNITED STATES PATENT AND TRADEMARK OFFICE
CERTIFICATE OF CORRECTION

PATENT NO. : 10,366,414 B1  
APPLICATION NO. : 15/178833  
DATED : July 30, 2019  
INVENTOR(S) : Bhattacharjee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 104 days.

Signed and Sealed this  
Nineteenth Day of May, 2020

Andrei Iancu  
*Director of the United States Patent and Trademark Office*